United States Patent [19]
Blackband

[11] 3,754,264
[45] Aug. 21, 1973

[54] RADIO DIRECTION FINDING APPARATUS
[75] Inventor: William Thomas Blackband, Farnborough, England
[73] Assignee: The Secretary of State for Defence in Her Britannic Majesty's Government of the United Kingdom of Great Britain and Northern Ireland, Whitehall, London, England
[22] Filed: Sept. 15, 1971
[21] Appl. No.: 180,820

[30] Foreign Application Priority Data
Sept. 16, 1970 Great Britain .................. 44,194/70

[52] U.S. Cl. ................................. 343/118, 343/705
[51] Int. Cl. .............................................. G01s 3/20
[58] Field of Search ................. 343/118 R, 113 DE, 343/705

[56] References Cited
UNITED STATES PATENTS
3,144,646  8/1964  Breithaupt ............ 343/113 DE UX
3,611,376  10/1971  Gutleber ........................... 343/11 R
3,047,864  7/1962  Byatt ........................... 343/118 R X Primary Examiner—Benjamin A. Borchelt
Assistant Examiner—Richard E. Berger
Attorney—Moore & Hall

[57]  ABSTRACT

Radio direction finding apparatus for rotary wing aircraft includes an antenna, a radio receiver and modulation detection circuits for detecting a modulation component in the receiver output due to the interaction between the rotary wing and the antenna. The antenna is mounted on the aircraft so that the modulation component has a maximum value when the aircraft is orientated in the direction of the source of a suitable radio signal. An indicator is provided for indicating the strength of the modulation component. The detection circuits may include a phase sensitive detector or a band-pass filter.

3 Claims, 2 Drawing Figures

3,754,264

RADIO DIRECTION FINDING APPARATUS

BACKGROUND OF THE INVENTION

This invention relates to radio direction finding apparatus for rotary-wing aircraft.

Some conventional radio direction finding systems operate so as to find a null in a receiver aerial radiation pattern and have the disadvantage that the received signal is at minimum strength when the direction of the source of the signals has been located. This creates difficulties and may lead to inaccuracy especially in conditions of poor signal to noise ratio.

Other conventional systems employ two independent directional aerials which are mounted so as to be screened from each other by the aircraft fuselage, and switching apparatus connecting each aerial in turn to the receiver. By noting the aircraft heading which equalizes the signals received by the two aerials, the direction of the source of the signals can be determined.

It is an object of the present invention to provide a radio direction finding or homing system in which a direction indication can be achieved by an adjustment giving a maximum signal.

SUMMARY OF THE INVENTION

According to the present invention there is provided radio direction finding apparatus for use in rotary wing aircraft including a radio receiver and means for detecting modulation of the receiver output resulting from the rotation of the rotary wing of the aircraft. It may include a transducer for producing a periodic signal in synchronism with the rotation of the rotary-wing and a phase sensitive detector having inputs respectively connected to the radio receiver and to the transducer.

The electromagnetic fields established by radio signals in the vicinity of an aerial on a rotary wing aircraft are in many cases affected by the instantaneous position of the rotary wing relative to the fuselage of the aircraft. Hence the rotation of the rotary wing tends to modulate the sensitivity of the aerial. This effect is most marked in relation to directional aerials and with signals for which the length of the aircraft is approximately one half wavelength. For instance, a typical directional aerial may have a radiation sensitivity pattern shaped like a figure of eight and the rotation of the rotary wing may cause the pattern to oscillate about its center as the rotary wing rotates. This oscillation imparts a modulation to a received signal. When signals are received from the direction of one of the maxima of the radiation sensitivity pattern, then the oscillation of the pattern has a comparatively slight effect on the input signal to the receiver. However when signals are received from a direction close to a null of the sensitivity pattern, the oscillation considerably varies the input signal at the receiver, thereby causing the receiver output to vary at the frequency of the oscillation. This frequency depends on the number of rotor blades and their rate of rotation and typically may be a few cycles per second. The result thus appears as a low-frequency modulation of the output of the receiver, synchronous with the rotor movement. The magnitude of the amplitude modulation component of the receiver output signal will be greatest for signals arriving from the direction of the null of the radiation pattern. If the radiation pattern is arranged to have its null or nulls aligned with the longitudinal axis of the aircraft then by noting the heading of the aircraft which maximizes the rotor modulation effect, the direction of the source of the radio signals can be determined. This is particularly useful for homing guidance.

The modulation component of a received signal is readily extracted by means of filters or detectors. For example a phase sensitive detector may be used, a reference signal being provided by a rotor position transducer.

In cases where the rotary wing has an odd number of blades, the phase of the modulation relative to the phase of the reference signal can be used to resolve the ambiguity presented by the two nulls of a figure of eight radiation sensitivity pattern.

Direction finding and homing using the method of this invention has the advantage that a signal maxima is being sought or followed rather than a null as with some conventional systems; thus a more definite indication of direction is provided especially when the signal to noise ratio of the received signal is poor.

An embodiment of the invention for use in a helicopter will now be described, by way of example only, with reference to the accompanying drawings of which:

DESCRIPTION OF THE PREFERRED EMBODIMENTS

Figure 1:
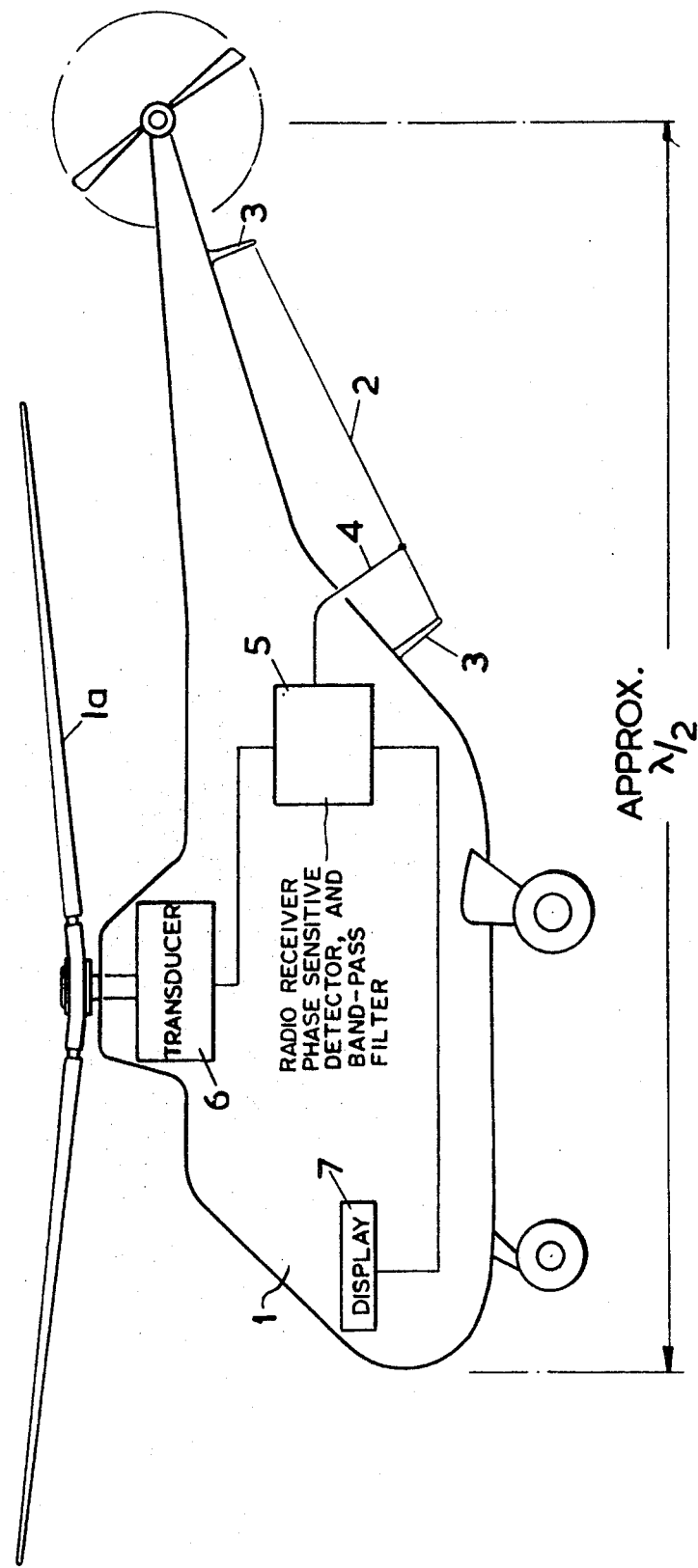
FIG. 1 shows a helicopter including radio direction finding apparatus according to the invention.

In FIG. 1 a helicopter 1 has a three bladed rotary wing 1a and is provided with an aerial 2 which is supported on a nonrotating part of the aircraft by struts 3. A feeder cable 4 connects the aerial 2 to an input of a radio receiver 5. A rotor position transducer 6 has an output connected to a reference input of a phase sensitive detector (not shown) in the receiver 5. A output from the receiver 5, supplied by the phase sensitive detector, is connected to an indicator 7.

The wavelength to which the receiver and aerial are tuned is approximately twice the length of the helicopter as indicated in FIG. 1. The radiation pattern of the aerial is arranged to resemble that shown in FIG. 2 and the null directions XO, OX' are aligned with the longitudinal axis of the helicopter.

Figure 2:
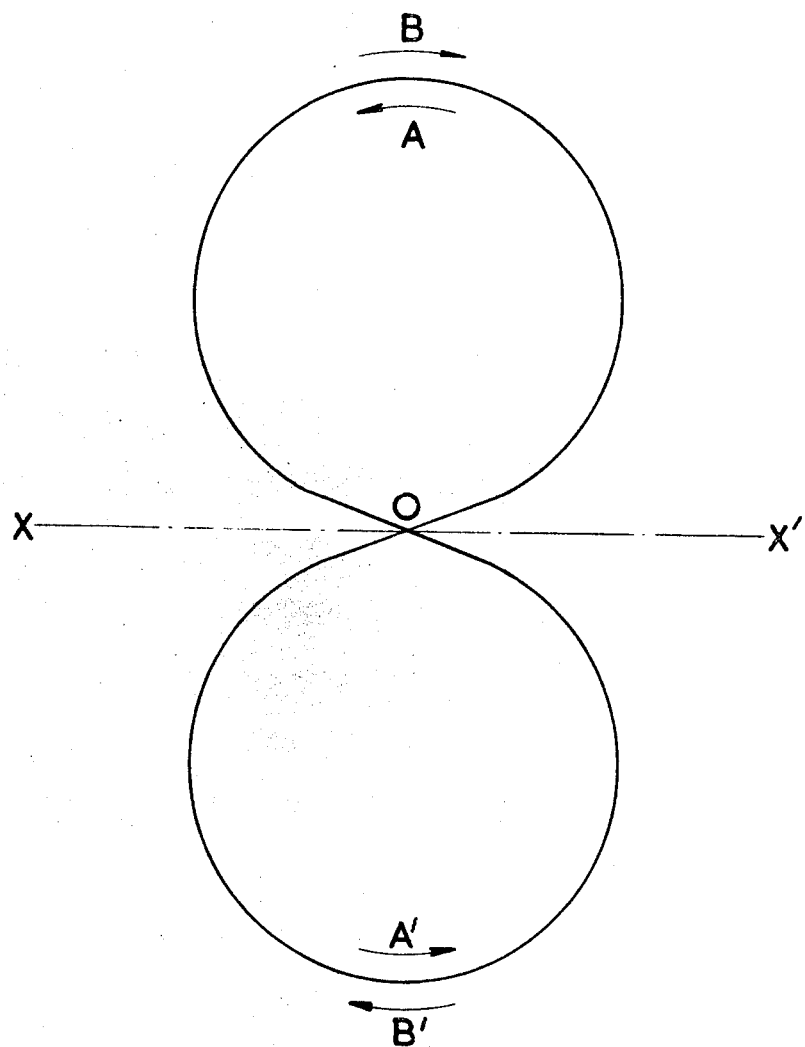
FIG. 2 shows a diagram representing a plan view of the radiation sensitivity pattern of the radio receiver aerial in FIG. 1.

In operation the rotation of the rotor blades causes the radiation pattern of the aerial to oscillate as illustrated by the arrows A, A' and B,B' of FIG. 2. This oscillation imparts a low frequency amplitude modulation to the receiver input signal and consequently the receiver output will have a similar fluctuation. As described hereinbefore this modulation will be greater on a signal received from the direction of the null axis.

With a three-bladed rotor the modulation signal undergoes an extreme excursion each time a rotor blade passes over the fuselage and the phase of the signal accordingly provides a means of distinguishing between the two nulls of the figure of eight pattern. The transducer 6 provides a signal which indicates the position of the rotor blades with respect to the longitudinal axis of the helicopter and which serves as a reference signal for the phase sensitive detector (not shown) in the receiver 5. The detector is connected in a conventional manner so that it produces a positive output voltage only for signals which are received in phase with each other. In the present apparatus the rotor modulation on the received signals will be in phase with the rotor transducer signal only on signals received from a transmitter ahead of the aircraft, so that the ambiguity inherent in the figure of eight pattern is eliminated. The output signal of the phase sensitive detector is supplied to a simple indicator 7.

In use the helicopter heading is altered until the indicator 7 shows a maximum value. The heading is then the bearing of the source of radio signals to which the receiver is tuned.

This embodiment has been described by way of example only and many variations thereof will now be apparent to those skilled in the art. For example a band pass filter may be used to extract the modulation signal. The aerial radiation pattern may be arranged to have one null only.

I claim:

1. Radio direction finding apparatus in an aircraft having a rotary wing, comprising
antenna means mounted on a nonrotating part of the aircraft and having a directional sensitivity dependent on the orientation of the rotary wing of the aircraft, a radio receiver connected to the antenna means, detector means connected to the radio receiver for detecting a modulation of the receiver output resulting from the rotation of the said rotary wing, and indicator means connected to the detector means for indicating the strength of the said modulation.

2. Apparatus as claimed in claim 1 wherein the said means for detecting the modulation includes a transducer connected to the rotary wing for producing a reference signal in synchronism with the motion of the said rotary wing, and a phase sensitive detector having inputs connected respectively to the transducer and to the receiver and an output supplying the said indicator means.

3. Apparatus as claimed in claim 1 wherein the said means for detecting the modulation includes a bandpass filter.

* * * * *